United States Patent
Hsu et al.

(10) Patent No.: US 8,613,551 B2
(45) Date of Patent: Dec. 24, 2013

(54) SLIDE RAIL STRUCTURE FOR ELECTRONIC DEVICE

(75) Inventors: An Szu Hsu, New Taipei (TW); Chien Cheng Mai, New Taipei (TW); Way Han Dai, New Taipei (TW)

(73) Assignee: First Dome Corporation, New Taipei (TW)

( * ) Notice: Subject to any disclaimer, the term of this patent is extended or adjusted under 35 U.S.C. 154(b) by 5 days.

(21) Appl. No.: 13/415,891

(22) Filed: Mar. 9, 2012

(65) Prior Publication Data

US 2013/0236131 A1 Sep. 12, 2013

(51) Int. Cl.
*F16C 17/00* (2006.01)

(52) U.S. Cl.
USPC .......................................................... 384/26

(58) Field of Classification Search
USPC .............. 384/7, 20–23, 26, 40–42; 455/575.4
See application file for complete search history.

(56) References Cited

U.S. PATENT DOCUMENTS

| | | | | |
|---|---|---|---|---|
| 7,107,084 B2 * | 9/2006 | Duarte et al. | ............... | 455/575.3 |
| 2009/0163259 A1 * | 6/2009 | Li et al. | ...................... | 455/575.4 |
| 2009/0305754 A1 * | 12/2009 | Yuan | .......................... | 455/575.4 |

* cited by examiner

*Primary Examiner* — Phillip A Johnson
(74) *Attorney, Agent, or Firm* — Morton J. Rosenberg

(57) ABSTRACT

A slide rail structure with stable movement and rotation is provided for an electronic device. The slide rail structure includes a base capable of being assembled with a fixed machine body, a tractor capable of being pivoted to a sliding module and movably disposed on the base, and an elastic body including a fixed end connected to the base and a pivot end connected to the tractor. The tractor, incorporated with the elastic body to assist in moving the sliding module, is capable of providing the sliding module with stable and smooth motion.

52 Claims, 7 Drawing Sheets

SLIDE RAIL STRUCTURE FOR ELECTRONIC DEVICE

BACKGROUND OF THE INVENTION

1. Field of the Invention

The present invention relates to a slide rail structure for an electronic device, in particular relates to an incorporated arrangement of a tractor and an elastic body to assist in stabilizing the motion of a sliding machine body or sliding module.

2. Description of the Related Art

Conventionally, electronic devices such as mobile phones, portable computers, personal digital assistants (PDAs), digital cameras and e-books, etc., are provided with a slide cover and/or a rotary shaft system which are/is capable of being reciprocally moved or rotated by an external force, so that a slide cover module (e.g., monitor) of the electronic device can be slid or rotated to perform an opening and closing processes.

These slide cover modules or portions are often applied with an assembly of a slide component or module and a rotation component provided with a rotatable ring, generally incorporated with elastic ring, elastic fastener or spring for storing energy or providing released energy, to assist in moving the slide cover module (or slide module) to perform the opening, closing and rotation functions.

One topic related to operations, motions and structural designs of the above-described monitor/slide cover module or component of the electronic device is that, when pushing the slide cover module, it is laborious for a user to move the monitor or slide cover module at an initial stage due to a long force-applying time. That is, the operating force of the user has to resist a spring back force of an elastic member when the slide cover module is pushed at the initial stage or in a first half stroke. Until the slide cover module is at least moved to a second or latter half stroke, the user can move the slide cover module in a labor-saving way by incorporating with the energy released from the elastic member. Therefore, it can be appreciated that the laborious way to move the monitor or slide cover module at the first half stroke increases the operational difficulty to the user.

Further, in some of these conventional arts, particular elements such as movable shelf, linking-up plate, elastic members, and wire used for linked traction or guide rail formed of particular shape, are utilized to assist in moving the slide cover modules or components to perform the opening and closing motions. However, in the process of the slide cover module or component operated by an external force (e.g., a single-side thrust force from a user), shakiness of the slide cover component or the related mechanism is occurred more easily, thus affecting the motion stability of the slide cover components. Moreover, in some particular conditions, shakiness of the slide cover component or the related mechanism is also occurred due to unequal energy released from the elastic members. Thus, it can be appreciated that shakiness of the slide cover component is unfavorable to the inner precise components thereof.

Another topic related to applications and structural designs of the above-described slide device which is combined with the wire used for linked traction is that, due to elastic property and flexibility of the wire traction, kinetic energy transmission delay, offset and shakiness of the sliding module are definitely occurred.

Representatively speaking, the disclosures of the above-mentioned reference data are related to the slide cover modules in the aspect of operation and structural design. If the structure and the application of the slide cover or the slide cover module and the related components can be properly redesigned and reconsidered, the use pattern and the range of application of the slide cover or the slide cover module can be advancedly altered and increased, thus to be distinguished from conventional products and methods. According to this measure, offset or shakiness or of the slide cover component in conventional skills can be improved, and the slide device can have enhanced stability in the aspect of operation and motion. Therefore, when redesigning the structure and the application of the slide cover or the slide cover module and the related components, the following topics shall be carefully considered.

Firstly, in order to improve the condition that the user takes a long force-applying time to laboriously and difficultly push the sliding module at the initial stage (at least capable of moving the sliding module to a distance over half of the stroke), it can provide a design of a slide rail structure which is capable of assisting the sliding module in sliding motion, or generating an acting force to assist in moving the sliding module to automatically slide for an opening function when the sliding module is operated by an external force.

Secondly, in the aspect of operation and motion of the sliding module, stability and smoothness of the sliding module of the slide rail structure shall be increased, so that shakiness or offset of the sliding module or components can be possibly and minimized.

Thirdly, the combination structure of the wire used for traction in the conventional sliding device shall be eliminated, i.e., the problem such as kinetic energy transmission delay or shakiness of the sliding module caused therefrom can be neglected.

However, the above-described topics do not physically taught or implied in the cited reference data.

BRIEF SUMMARY OF THE INVENTION

In view of this, the purpose of the present invent is to provide a slide rail structure for an electronic device, capable of providing stable movement and rotation functions when the slide rail structure is operated. The slide rail structure includes a base capable of being assembled with a fixed machine body, a tractor capable of being pivoted to a sliding module and movably disposed on the base, and an elastic body including a fixed end connected to the base and a pivot end connected to the tractor. The tractor, incorporated with the elastic body to assist in moving the sliding module, is capable of providing the sliding module with stable and smooth motion.

According to the slide rail structure for the electronic device of the present invention, the base include a groove, and the elastic body (or a pivot end the elastic body) is allowed to incorporate with the displacement of the tractor to store energy therein or release energy therefrom when the elastic body is moved along the groove of the base.

According to the slide rail structure for the electronic device of the present invention, the base is arranged on a frame, the fixed end of the elastic body is fixed on the frame, and the pivot end of the elastic body is allowed to pass through the groove of the base to pivot to the tractor.

According to the slide rail structure for the electronic device of the present invention, the elastic body is in an energy-stored state when the sliding module is covered on the fixed machine body. Therefore, when the sliding module is operably moved by an external force, the energy stored in the elastic body is gradually released to form an acting force to assist in moving the sliding module, thereby reducing a user's operating force initially utilized to move the sliding module in a first half stroke.

According to the slide rail structure for the electronic device of the present invention, the tractor includes a hand portion and a cotter hole disposed on the hand portion, and the cotter hole of the tractor is engaged with a fastener so that the tractor is assembled with a sliding module.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
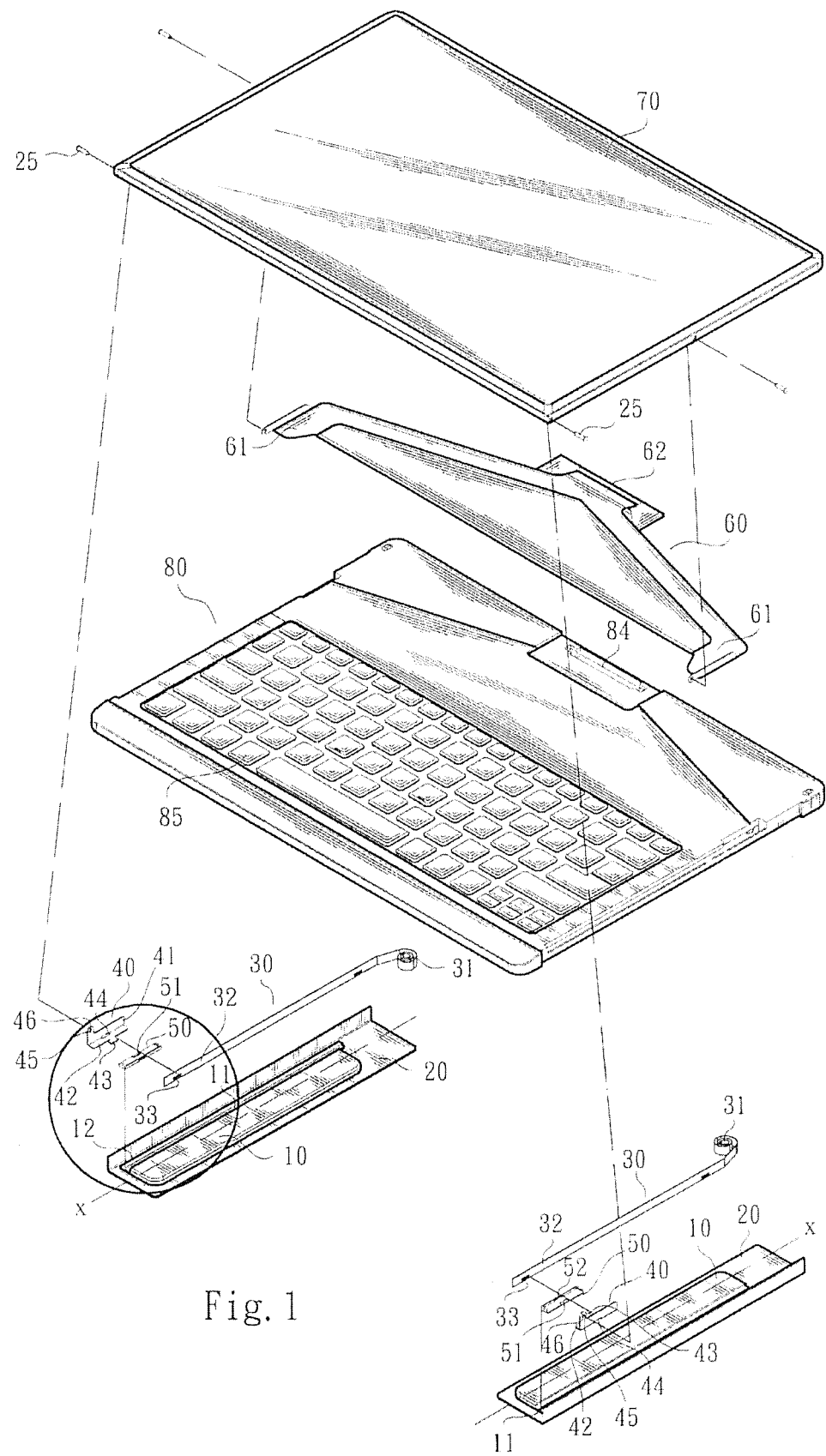
FIG. 1 is an exploded schematic view of a structure of an embodiment of the present invention, illustrating an arrangement relationship of a sliding module, a connecting arm, a fixed machine body, a base, a frame, an elastic body, a tractor and a carrier.
Figure 2:
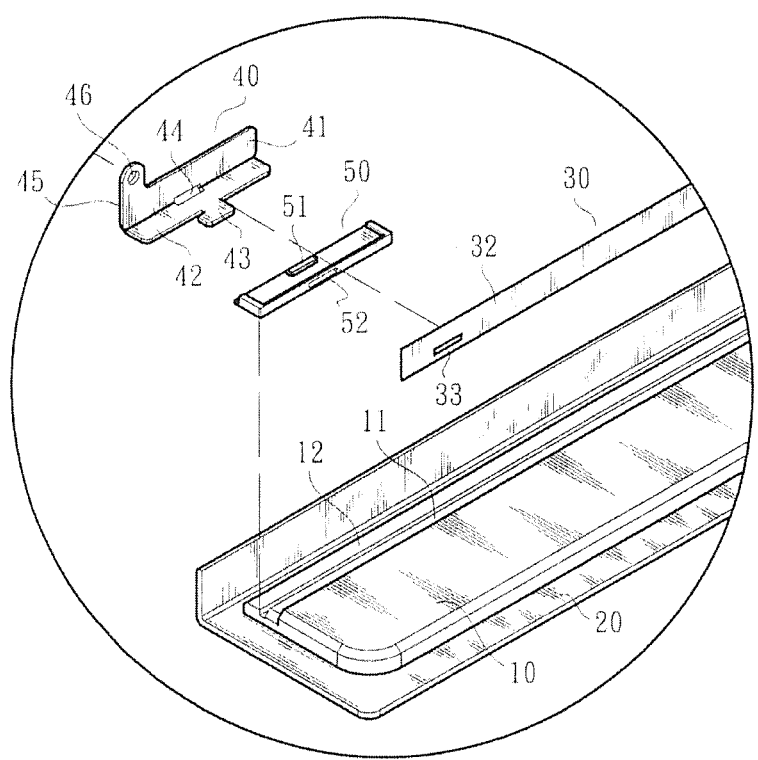
FIG. 2 is an enlarged schematic view of a partial structure of FIG. 1, illustrating the state of the base, the frame, the tractor and the carrier.
Figure 3:
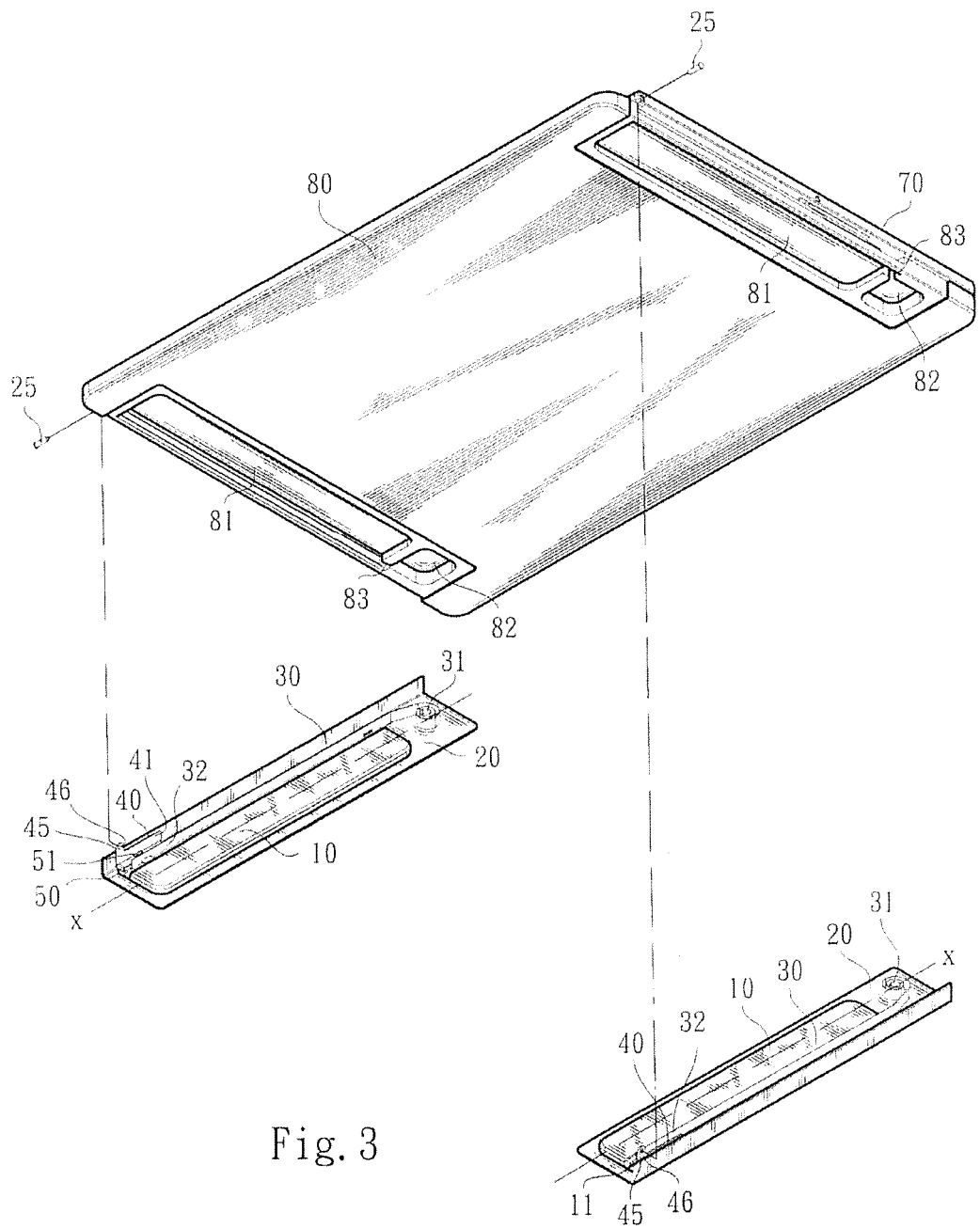
FIG. 3 is a schematic view of an arrangement of a base, a frame, an elastic body, a tractor and a fixed machine body in an embodiment of the present invention, illustrating the fixed machine body disposed with a first slot compartment and a second slot compartment.

Referring to FIGS. 1, 2 and 3, a slide rail structure for an electronic device of the present invention comprises a base generally denoted by reference numeral 10 and defined with a reference axis $\chi$, an elastic body 30, and a tractor 40 movably disposed on the base 10. The base 10 comprises a groove H and a ridge portion 12 located next to the groove H, and the groove 11 and the ridge portion 12 are arranged in a direction parallel to the reference axis $\chi$. The elastic body 30 is allowed to move along the groove 11 of the base 10 so as to store energy therein or release energy therefrom. In an adopted embodiment, the base 10 is arranged on a frame 20 which is formed of a plate type of L-shaped section.

In a preferred embodiment, the elastic body 30 selected from type of a constant force spring comprises a fixed end 31 which is fixed on the frame 20 and a pivot end 32 which is pivoted or connected to the tractor 40 by passing through the groove 11 of the base 10. The tractor 40 can be freely moved on the base 10 or the ridge portion 12 of the base 10.

FIGS. 2 and 3 particularly show that the tractor 40 comprises a first zone 41 and a second zone 42, the first zone 41 and the second zone 42 of the tractor 40 are mutually perpendicular to each other so as to form a plate type of L-shaped section. The first zone 41 of the tractor 40 comprises a hand portion 45 and a cotter hole 46 disposed on the hand portion 45, and the cotter hole 46 of the first zone 41 of the tractor 40 is engaged with a fastener 25, so that the tractor 40 is assembled with a sliding module 70 (e.g., a slide cover or monitor). With the arrangement of the cotter hole 46 of the tractor 40 and the fastener 25 to be served as a spindle pivot for the sliding module 70, the sliding module 70 can be formed as a type of being freely rotated. It is understood that the sliding module 70 and a fixed machine body 80 are assembled into a type of a tablet personal computer (PC) or a portable computer.

FIGS. 2 and 3 also illustrate that the second zone 42 of the tractor 40 comprises an engaging portion 43, the pivot end 32 of the elastic body 30 comprises a hole 33 corresponding to the engaging portion 43 of the tractor 40, and the hole 33 of the pivot end 32 of the elastic body 30 is engaged with the engaging portion 43 of the second zone 42 of the tractor 40 so that the pivot end 32 of the elastic body 30 is pivoted to the tractor 40.

In an applicable embodiment, the tractor 40 is assembled with a carrier 50. Followed by the movement of the tractor 40, the carrier 50 similarly served as a spacer or pad is capable of being freely moved on the ridge portion 12 of the base 10. Specifically, the carrier 50 comprises a limiting portion 51 and an opening 52. In one embodiment, the limiting portion 51 of the carrier 50 is formed of type of a protrusion. The tractor 40 further comprises a connecting portion 44 disposed between the first zone 41 and the second zone 42, in which the connecting portion 44 corresponding to the limiting portion 51 of the carrier 50 is formed of type of an opening. When installing the tractor 40 to the carrier 50, the engaging portion 43 of the tractor 40 is passed through the opening 52 of the carrier 50 to assemble with the hole 33 of the pivot end 32 of the elastic body 30, and the limiting portion 51 of the carrier 50 is entered into the connecting portion 44 of the tractor 40, so that the tractor 40 and the carrier 50 are integrally assembled as shown in FIG. 3.

In an applicable embodiment shown in FIG. 3, the fixed machine body 80 comprises a first slot compartment 81, a second slot compartment 82 and a passage 83 formed between the first slot compartment 81 and the second slot compartment 82. When the base 10, the frame 20, the elastic body 30 and the tractor 40 are assembled on the fixed machine body 80, the base 10 can be received in the first slot compartment 81 of the fixed machine body 80, the fixed end 31 of the elastic body 30 can be received in the second slot compartment 82 of the fixed machine body 80, and the pivot end 32 of the elastic body 30 is passed through the passage 83 of the fixed machine body 80 to extend into the first slot compartment 81 of the fixed machine body 80, as shown in FIGS. 4 and 5.

Referring again to FIG. 1, in the adopted embodiment, the fixed machine body 80 is assembled with a sliding module 70 having a side region, a connecting arm 60 is disposed between the sliding module 70 and the fixed machine body 80, and the connecting arm 60 comprises a first end 61 rotatably pivoted to the side region of the sliding module 70 and a second end 62 rotatably pivoted to the fixed machine body 80. FIG. 1 also illustrates that the fixed machine body 80 further comprises a recessed compartment 84 utilized to receive the second end 62 of the connecting arm 60.

Figure 4:
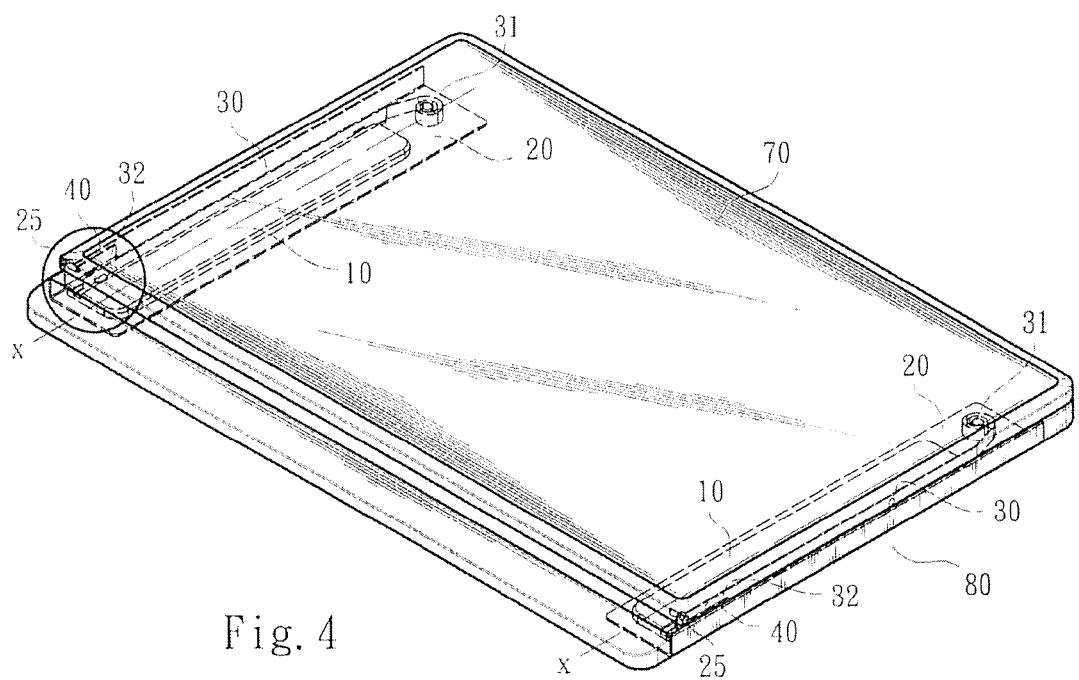
FIG. 4 is a schematic view of an assembly of a sliding module and a fixed machine body in an embodiment of the present invention, in which a dotted part illustrates a position relationship of a base, a frame, an elastic body and a tractor.
Figure 5:
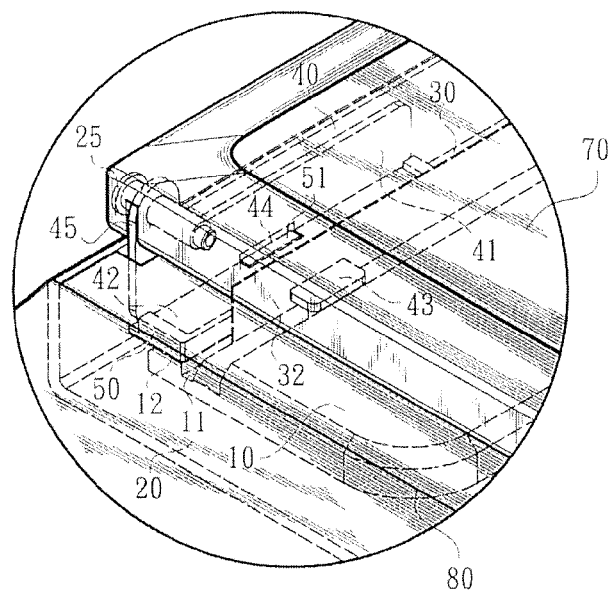
FIG. 5 is an enlarged schematic view of a partial structure in FIG. 4.
Figure 6:
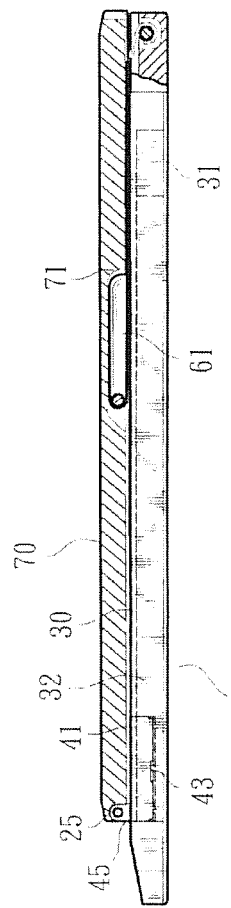
FIG. 6 is a sectional schematic view of a structure in FIG. 4, illustrating a state of a tractor located at an initial position of a base.

Referring to FIGS. 4, 5 and 6, the state of the sliding module 70 assembled with or covered on the fixed machine body 80 is illustrated, in which a location of the tractor 40 and the carrier 50 are defined as an initial position of the base 10, and a final position corresponding to the initial position of the base 10 is defined. The pivot end 32 of the elastic body 30 located at the initial position of the base 10 is in an energy-stored state. FIG. 6 also illustrates that the side region of the sliding module 70 comprises a slot compartment 71 which is received with the first end 61 of the connecting arm 60.

Figure 7:
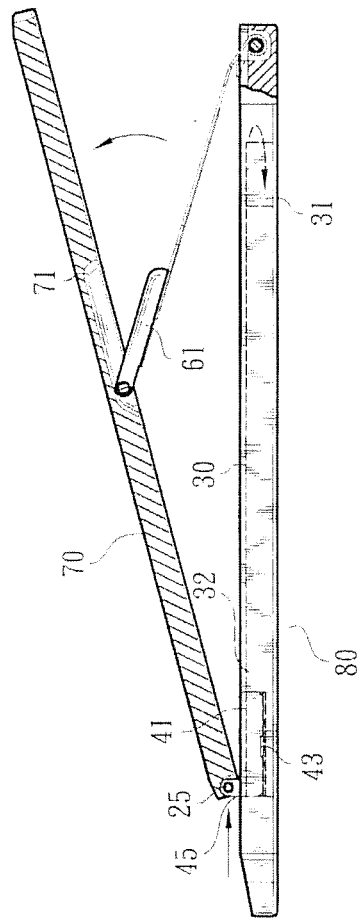
FIG. 7 is a schematic view of an embodiment of the present invention in an operation state, illustrating a movement state of a sliding module moved toward a final position and a sliding module supported by a connecting arm.
Figure 8:
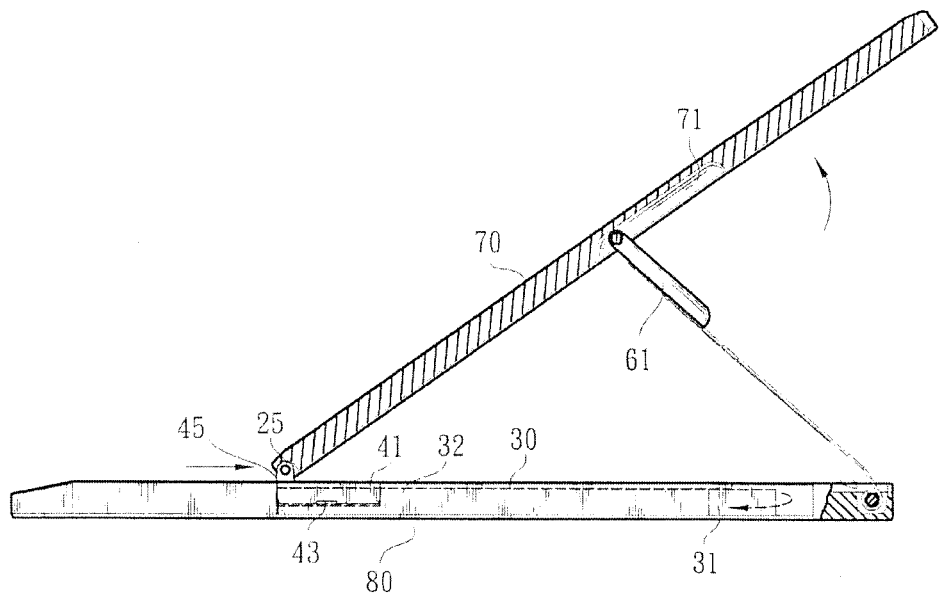
FIG. 8 is a schematic view of an embodiment of the present invention in another operation state, illustrating a movement state of a sliding module moved toward a final position and a sliding module supported by a connecting arm.

Referring to FIGS. 7 and 8, when the sliding module 70 is pushed to cause the tractor 40 and the carrier 50 to move toward the final position on the ridge portion 12 of the base 10, the energy stored in the elastic body 30 is gradually released to assist in moving the sliding module 70, thereby reducing a user's operating force initially utilized to move the sliding module 70 in a first half stroke. Besides, with the actuation of the operating force from the user, the first end 61 and the second end 62 of the connecting arm 60 are rotated to lift the sliding module 70, and the sliding module 70 can be formed of types of different angles by rotating about the spindle pivot which is constituted by the fastener 25 and the tractor 40 (or the cotter hole 46 of the hand portion 45). With the sliding module 70 supported by the connecting arm 60, it allows the user operate a touch-controlled function provided from the sliding module 70.

Figure 9:
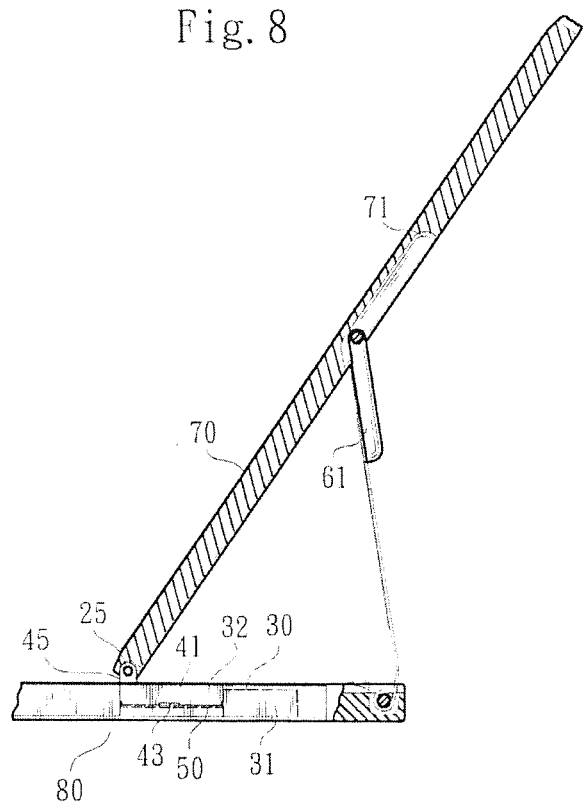
FIG. 9 is a schematic view of an embodiment of the present invention in still another operation state, illustrating a movement state of a sliding module arrived at a final position and a sliding module supported by a connecting arm so as to provide a touch-controlled function.
Figure 10:
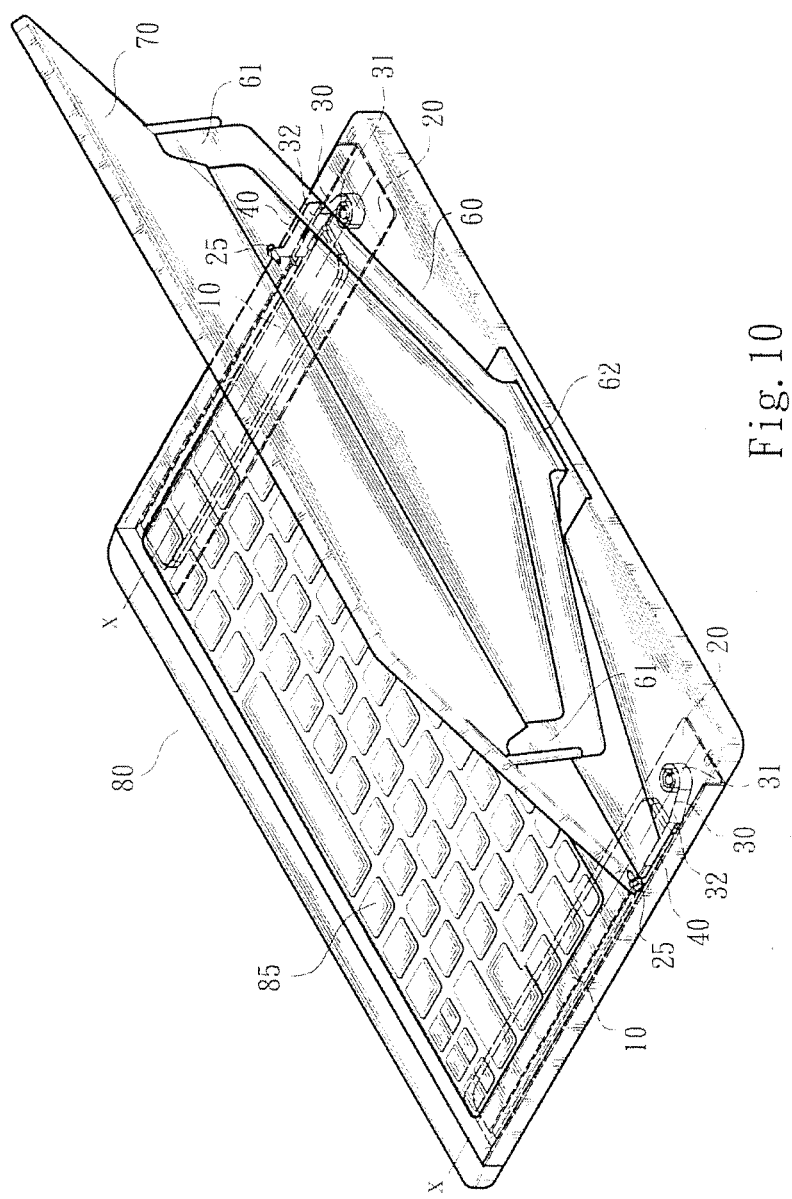
FIG. 10 is a schematic view of an external appearance of an embodiment of FIG. 9.

Referring to FIGS. 9 and 10, the tractor 40, the carrier 50 and the elastic body 30 which are reached at the final position when releasing the energy stored in the elastic body 30 and the sliding module 70 which is located at an operation position (suitable for the touch-controlled operations from user on a keyboard zone 85) are illustrated. At this time, the sliding module 70 is also stably supported by the connecting arm 60, so that the state of the sliding module 70 is particularly suitable for the user to perform the touch-controlled operations on the keyboard zone 85.

In an applicable embodiment, with suitable arrangements or designs, a frictional force formed between the tractor 40 (or the carrier 50) and the ridge portion 12 of the base 10 is equal to or slightly greater than a resultant which is formed by a gravity of the sliding module 70 and a pull-up force or an acting force of a releasing energy of the elastic body 30. Under the above-described conditions, the sliding module 70 can be arbitrarily stopped or positioned in the moving process. It is helpful to prevent the sliding module 70 from being affected by an abrupt vibration or shakiness, i.e., the tractor 40 and the elastic body 30 are incorporated to assist in stabilizing the movement of the sliding module 70.

Representatively speaking, with the slide rail structure for the electronic device capable of assisting in moving the sliding module 70, the slide rail structure of the present invention provides the following considerations and advantages, compared to conventional skills.

Firstly, the structural and operational conditions and use patterns of the sliding module 70, the fixed machine body 80 and the components connected therewith in the present invention have been redesigned and reconsidered, which are totally different from conventional skills. For example, the groove 11 and the ridge portion 12 of the base 10, and the first and second slot compartments 81 and 82 and the passage 83 of the fixed machine body 80 are provided for receiving the elastic body 30, or the tractor 40 and the carrier 50 are allowed to freely move on the ridge portion 12 of the base 10.

Secondly, in comparison with conventional skills, the sliding module 70 operated by an external force is capable of incorporating with the energy released from the elastic body 30 which forms the acting force to assist in moving the sliding module 70 to automatically perform the sliding and opening functions, thereby shortening the force-applying time of the user when pushing the sliding module at the initial stage (at least capable of moving the sliding module to a distance over half of the stroke), providing a labor-saving way to move the sliding module, and reducing the operational difficulty to the user.

Thirdly, the fitting structure of the base 10, the elastic body 30 and the tractor 40 (or the carrier 50) is capable of increasing stability and smoothness of the sliding module 70 in the aspect of operation and motion and reducing shakiness of the sliding module 70 or components possibly. In addition, kinetic energy transmission delay or shakiness of the sliding module in the combination structure of the traction wire in the conventional sliding device can be eliminated.

In summary, the slide rail structure for the electronic device of the present invention provides a unique spatial pattern different from conventional skills and incomparable advantages and inventiveness.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A slide rail structure for an electronic device, comprising:
   a base defined with a reference axis;
   a tractor movably disposed on the base, the tractor being assembled with a carrier; and
   an elastic body comprising a fixed end and a pivot end connected to the tractor;
   wherein the carrier comprises a limiting portion and an opening; and
   wherein the pivot end of the elastic body comprises a hole, and the tractor comprises an engaging portion passed through the opening of the carrier to assemble with the hole of the pivot end of the elastic body.

2. The slide rail structure for the electronic device as claimed in claim 1, wherein the base comprises a groove and a ridge portion located next to the groove, the groove and the ridge portion are arranged in a direction parallel to the reference axis, the pivot end of the elastic body is allowed to pass through the groove of the base, and the tractor is disposed on the ridge portion of the base.

3. The slide rail structure for the electronic device as claimed in claim 1, wherein the base is arranged on a longer portion of an L-shaped frame.

4. The slide rail structure for the electronic device as claimed in claim 3, wherein the fixed end of the elastic body is fixed on the frame.

5. The slide rail structure for the electronic device as claimed in claim 3, wherein the base and the frame are disposed on a fixed machine body, the fixed machine body comprises a first slot compartment, a second slot compartment and a passage formed between the first slot compartment and the second slot compartment, the first slot compartment of the fixed machine body is utilized to receive the base, the second slot compartment of the fixed machine body is utilized to receive the fixed end of the elastic body, and the pivot end of the elastic body is passed through the passage of the fixed machine body to extend into the first slot compartment of the fixed machine body.

6. The slide rail structure for the electronic device as claimed in claim 5, wherein the fixed machine body is assembled with a sliding module having a side region, a connecting arm is disposed between the sliding module and the fixed machine body, and the connecting arm comprises a first end rotatably pivoted to the side region of the sliding module and a second end rotatably pivoted to the fixed machine body.

7. The slide rail structure for the electronic device as claimed in claim 6, wherein the fixed machine body further comprises a recessed compartment.

8. The slide rail structure for the electronic device as claimed in claim 6, wherein the side region of the sliding module comprises a slot compartment.

9. The slide rail structure for the electronic device as claimed in claim 3, wherein the base and the frame are disposed on a fixed machine body assembled with a sliding module, and a frictional force formed between the tractor and the base is slightly greater than a resultant force which is formed by a gravity of the sliding module and an acting force of a releasing energy of the elastic body.

10. The slide rail structure for the electronic device as claimed in claim 3, wherein the base and the frame are disposed on a fixed machine body assembled with a sliding module, and a frictional force formed between the tractor and the base is equal to a resultant force which is formed by a gravity of the sliding module and an acting force of a releasing energy of the elastic body.

11. The slide rail structure for the electronic device as claimed in claim 1, wherein the elastic body comprises a constant force spring.

12. The slide rail structure for the electronic device as claimed in claim 1, wherein the tractor comprises a first zone and a second zone, and the first zone and the second zone of the tractor are mutually perpendicular to each other so as to form an L-shaped section.

13. The slide rail structure for the electronic device as claimed in claim 12, wherein the first zone of the tractor comprises a hand portion and a cotter hole disposed on the hand portion, and the cotter hole of the first zone of the tractor is engaged with a fastener so that the tractor is assembled with a sliding module.

14. The slide rail structure for the electronic device as claimed in claim 12, wherein the second zone of the tractor comprises an engaging portion, and the pivot end of the elastic body comprises a hole engaged with the engaging portion of the second zone of the tractor, so that the pivot end of the elastic body is pivoted to the tractor.

15. The slide rail structure for the electronic device as claimed in claim 1, wherein the limiting portion of the carrier is formed of a protrusion.

16. The slide rail structure for the electronic device as claimed in claim 1, wherein the tractor comprises a first zone, a second zone, and a connecting portion disposed between the first zone and the second zone and assembled with the limiting portion of the carrier.

17. The slide rail structure for the electronic device as claimed in claim 16, wherein the connecting portion of the tractor is formed of an opening.

18. A slide rail structure for an electronic device, comprising:
a base defined with a reference axis;
a tractor movably disposed on the base; and
an elastic body comprising a fixed end and a pivot end connected to the tractor;
wherein the base is arranged on a longer portion of an L-shaped frame; and
wherein the base and the frame are disposed on a fixed machine body, the fixed machine body comprises a first slot compartment, a second slot compartment and a passage formed between the first slot compartment and the second slot compartment, the first slot compartment of the fixed machine body is utilized to receive the base, the second slot compartment of the fixed machine body is utilized to receive the fixed end of the elastic body, and the pivot end of the elastic body is passed through the passage of the fixed machine body to extend into the first slot compartment of the fixed machine body.

19. The slide rail structure for the electronic device as claimed in claim 18, wherein the base comprises a groove and a ridge portion located next to the groove, the groove and the ridge portion are arranged in a direction parallel to the reference axis, the pivot end of the elastic body is allowed to pass through the groove of the base, and the tractor is disposed on the ridge portion of the base.

20. The slide rail structure for the electronic device as claimed in claim 18, wherein the elastic body comprises a constant force spring.

21. The slide rail structure for the electronic device as claimed in claim 18, wherein the fixed end of the elastic body is fixed on the frame.

22. The slide rail structure for the electronic device as claimed in claim 18, wherein the tractor comprises a first zone and a second zone, and the first zone and the second zone of the tractor are mutually perpendicular to each other so as to form an L-shaped section.

23. The slide rail structure for the electronic device as claimed in claim 22, wherein the first zone of the tractor comprises a hand portion and a cotter hole disposed on the hand portion, and the cotter hole of the first zone of the tractor is engaged with a fastener so that the tractor is assembled with a sliding module.

24. The slide rail structure for the electronic device as claimed in claim 22, wherein the second zone of the tractor comprises an engaging portion, and the pivot end of the elastic body comprises a hole engaged with the engaging portion of the second zone of the tractor, so that the pivot end of the elastic body is pivoted to the tractor.

25. The slide rail structure for the electronic device as claimed in claim 18, wherein the tractor is assembled with a carrier.

26. The slide rail structure for the electronic device as claimed in claim 25, wherein the carrier comprises a limiting portion and an opening.

27. The slide rail structure for the electronic device as claimed in claim 26, wherein the limiting portion of the carrier is formed of a protrusion.

28. The slide rail structure for the electronic device as claimed in claim 26, wherein the pivot end of the elastic body comprises a hole, and the tractor comprises an engaging portion passed through the opening of the carrier to assemble with the hole of the pivot end of the elastic body.

29. The slide rail structure for the electronic device as claimed in claim 25, wherein the tractor comprises a first zone, a second zone, and a connecting portion disposed between the first zone and the second zone and assembled with the limiting portion of the carrier.

30. The slide rail structure for the electronic device as claimed in claim 29, wherein the connecting portion of the tractor is formed of an opening.

31. The slide rail structure for the electronic device as claimed in claim 18, wherein the fixed machine body is assembled with a sliding module having a side region, a connecting arm is disposed between the sliding module and the fixed machine body, and the connecting arm comprises a first end rotatably pivoted to the side region of the sliding module and a second end rotatably pivoted to the fixed machine body.

32. The slide rail structure for the electronic device as claimed in claim 31, wherein the fixed machine body further comprises a recessed compartment.

33. The slide rail structure for the electronic device as claimed in claim 31, wherein the side region of the sliding module comprises a slot compartment.

34. The slide rail structure for the electronic device as claimed in claim 18, wherein the base and the frame are disposed on a fixed machine body assembled with a sliding module, and a frictional force formed between the tractor and the base is slightly greater than a resultant force which is formed by a gravity of the sliding module and an acting force of a releasing energy of the elastic body.

35. The slide rail structure for the electronic device as claimed in claim 18, wherein the base and the frame are disposed on a fixed machine body assembled with a sliding module, and a frictional force formed between the tractor and the base is equal to a resultant force which is formed by a gravity of the sliding module and an acting force of a releasing energy of the elastic body.

36. A slide rail structure for an electronic device, comprising:
a base defined with a reference axis;
a tractor movably disposed on the base; and
an elastic body comprising a fixed end and a pivot end connected to the tractor;
wherein the base is arranged on a longer portion of an L-shaped frame; and the base and the frame are disposed on a fixed machine body assembled with a sliding module, and a frictional force formed between the tractor and the base is slightly greater than or equal to a resultant force which is formed by a gravity of the sliding module and an acting force of a releasing energy of the elastic body.

37. The slide rail structure for the electronic device as claimed in claim 36, wherein the base comprises a groove and a ridge portion located next to the groove, the groove and the ridge portion are arranged in a direction parallel to the reference axis, the pivot end of the elastic body is allowed to pass through the groove of the base, and the tractor is disposed on the ridge portion of the base.

38. The slide rail structure for the electronic device as claimed in claim 36, wherein the elastic body comprises a constant force spring.

39. The slide rail structure for the electronic device as claimed in claim 36, wherein the fixed end of the elastic body is fixed on the frame.

40. The slide rail structure for the electronic device as claimed in claim 36, wherein the tractor comprises a first zone and a second zone, and the first zone and the second zone of the tractor are mutually perpendicular to each other so as to form an L-shaped section.

41. The slide rail structure for the electronic device as claimed in claim 40, wherein the first zone of the tractor comprises a hand portion and a cotter hole disposed on the hand portion, and the cotter hole of the first zone of the tractor is engaged with a fastener so that the tractor is assembled with a sliding module.

42. The slide rail structure for the electronic device as claimed in claim 40, wherein the second zone of the tractor comprises an engaging portion, and the pivot end of the elastic body comprises a hole engaged with the engaging portion of the second zone of the tractor, so that the pivot end of the elastic body is pivoted to the tractor.

43. The slide rail structure for the electronic device as claimed in claim 36, wherein the tractor is assembled with a carrier.

44. The slide rail structure for the electronic device as claimed in claim 43, wherein the carrier comprises a limiting portion and an opening.

45. The slide rail structure for the electronic device as claimed in claim 44, wherein the limiting portion of the carrier is formed of a protrusion.

46. The slide rail structure for the electronic device as claimed in claim 44, wherein the pivot end of the elastic body comprises a hole, and the tractor comprises an engaging portion passed through the opening of the carrier to assemble with the hole of the pivot end of the elastic body.

47. The slide rail structure for the electronic device as claimed in claim 43, wherein the tractor comprises a first zone, a second zone, and a connecting portion disposed between the first zone and the second zone and assembled with the limiting portion of the carrier.

48. The slide rail structure for the electronic device as claimed in claim 47, wherein the connecting portion of the tractor is formed of an opening.

49. The slide rail structure for the electronic device as claimed in claim 36, wherein the base and the frame are disposed on a fixed machine body, the fixed machine body comprises a first slot compartment, a second slot compartment and a passage formed between the first slot compartment and the second slot compartment, the first slot compartment of the fixed machine body is utilized to receive the base, the second slot compartment of the fixed machine body is utilized to receive the fixed end of the elastic body, and the pivot end of the elastic body is passed through the passage of the fixed machine body to extend into the first slot compartment of the fixed machine body.

50. The slide rail structure for the electronic device as claimed in claim 49, wherein the fixed machine body is assembled with a sliding module having a side region, a connecting arm is disposed between the sliding module and the fixed machine body, and the connecting arm comprises a first end rotatably pivoted to the side region of the sliding module and a second end rotatably pivoted to the fixed machine body.

51. The slide rail structure for the electronic device as claimed in claim 50, wherein the fixed machine body further comprises a recessed compartment.

52. The slide rail structure for the electronic device as claimed in claim 50, wherein the side region of the sliding module comprises a slot compartment.

\* \* \* \* \*